United States Patent Office
3,180,101
Patented Apr. 27, 1965

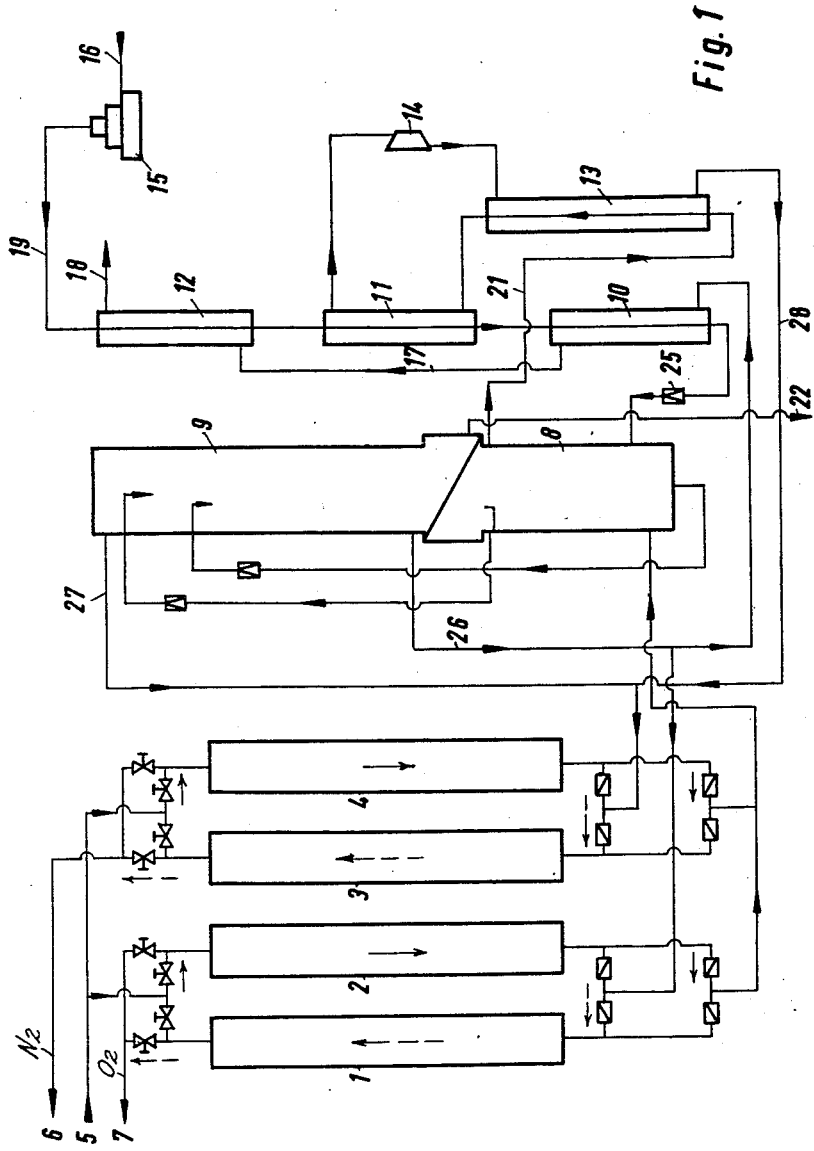

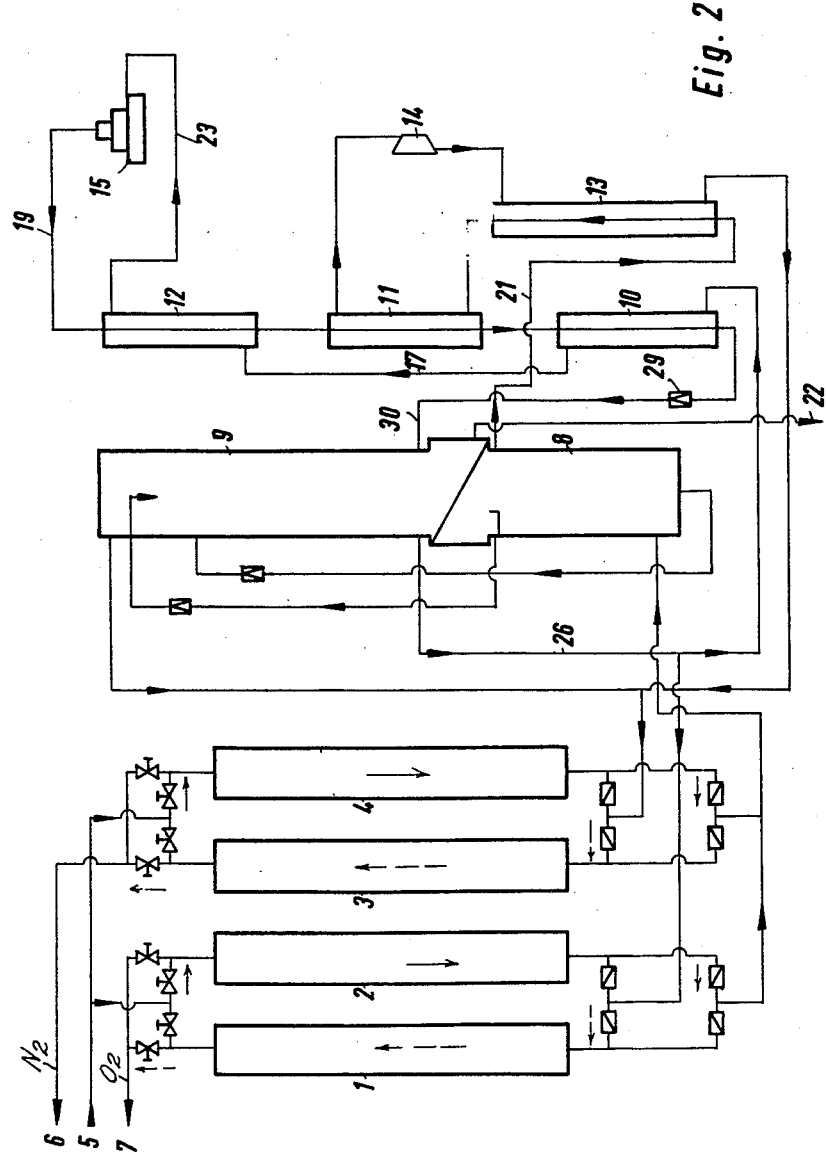

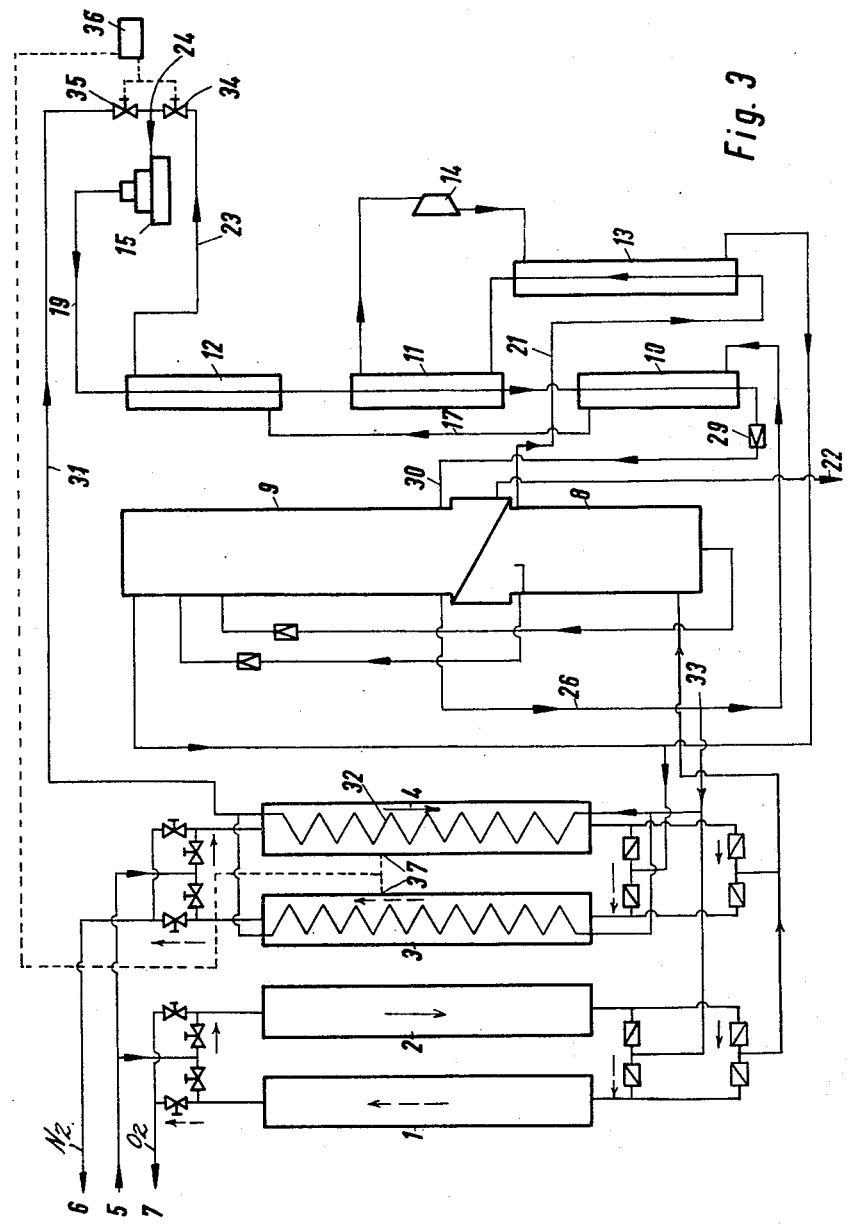

3,180,101
PROCESS AND APPARATUS FOR THE PRODUCTION OF COLD THROUGH WORK-YIELDING RELEASE OF PRESSURE
Max Seidel, Munich-Solln, Germany, assignor to Gesellschaft fur Linde's Eismaschinen Aktiengesellschaft, Hollriegelskreuth, near Munich, Germany, a company of Germany
Filed June 28, 1960, Ser. No. 39,377
Claims priority, application Germany, July 29, 1959, G 27,541
12 Claims. (Cl. 62—13)

This invention relates to a process and an apparatus for the production of cold for gas fluidation or gas separation through the expedient of work-performing expansion of pressure. In conventional processes the temperature of the gas is so selected, before the work-performing expansion of pressure, that after the work-performing expansion the temperature of the gas lies a little above the liquefaction temperature, since the expanded gas must have about the liquefaction temperature for the decomposition of or heat exchange with the heating gas.

This invention has as an object the provision of a process which makes it possible to produce the cold through work-performing expansion at much higher temperature than conventional, and thus to transform the cold produced to the necessary low temperature for decomposition of, or heat exchange with, the heating gas so that the process is, as a whole, economically more advantageous than the conventional process.

This invention consists, accordingly, in a process for the production of cold, especially gas liquefaction or low-temperature decomposition of a gas mixture by means of work-performing pressure expansion of a cold gas taken from a low-temperature apparatus, which gas is warmed before the pressure expansion preferably by means of a gas compressed to high pressure, with the distinction that the gas to be pressure-expanded is heated by a greater temperature rise interval than the amount of the temperature fall of the work-performing pressure expansion, and the gas expanded in heat exchange for the first warming of the gas to be pressure-expanded is indirectly cooled again, and only then is conducted back to the gas liquefaction or decomposition unit, while the gas to be pressure-expanded is indirectly heated again before expansion, preferably by a warming gas compressed to high pressure.

The gas to be expanded is taken cold from the low-temperature part of an apparatus for gas decomposition, said gas being heated in a first heating stage by indirect heat exchange with said gas itself after being expanded and in a second following heating stage indirectly by a heating-gas, the difference of temperature before and after heating in said second stage being about equal to the difference of temperature before and after expanding said gas.

According to a special form of the process of the warming gas is taken cold from the low-temperature part of the gas liquefaction or decomposition unit. Either pure gas or gas mixtures still undecomposed can be used for this. Such gas may be removed from the high- or low-pressure columns of a rectifier or any regenerator or heat exchanger or reversing exchanger which may be available. The warming gas is then heated by indirect heat-exchange with itself and then compressed in a compressor, preferably dry. The compressed and heated gas is cooled again, by indirect heat exchange, in opposite stream with itself and with the gas to be pressure-expanded for doing work, and the work-performing expanded gas is heated in the process. In another heat exchanger the high pressure gas is finally cooled in indirect heat exchange with at least a part of the uncompressed circulating gas, wholly or partly liquefied and pressure-expanded into a specially throttled decompression tank or rectifier.

The heating gas can also be conducted directly to the compressor from outside and after flowing through the counter current heat exchanger can be conducted to the rectifier or other part of the low-temperature unit.

It is also possible to take only a part of the heating gas cold from the low-temperature part, and to supplement this with another portion of circulation gas, which is first heated in indirect heat exchange with the gas to be liquefied or decomposed in the low-temperature unit. In either event the amount of the portions of gas conducted to the compressor depends on the temperature equilibrium of the unit and can be regulated by manual valves or automatically.

For a better understanding of the invention, and to show how the same is to be carried into effect, reference will now be made to the accompanying drawing, in which:

FIG. 1 is a diagrammatic representation of one apparatus combination for carrying out the process aspect of the invention; and FIGS. 2 and 3 diagrammatically represent two alternative forms of the apparatus.

In the drawings are shown units for carrying out the process, schematically and by way of example. In these, the same parts are marked with the same reference numbers. For the gas decomposition unit a greatly simplified scheme with regenerators is selected. Naturally, for the heat exchangers in the unit, simple counter-flow or reversing exchangers can be used.

In the drawings, 1, 2, 3 and 4 are regenerators into which compressed air flows through the line 5. Nitrogen or oxygen can be removed through lines 6 and 7. The lower part of a two-stage rectifying column is designated with the reference numeral 8, and the upper part of said column with 9. A high-pressure compressor is designated with the reference numeral 15, and a pressure expansion machine with numeral 14. Heat exchangers are represented at 10, 11, 12 and 13. If desired, fluid oxygen can be removed from the system through a line designated 22.

In FIG. 1 a unit is shown in which purified and dried air, in the form of high-pressure heating gas, is conducted through a line 16 to the compressor 15. It flows then through a line 19 and finally, in succession, through heat exchangers 12, 11 and 10. After that, the high pressure gas is work-performingly expanded in a valve 25, and conducted to the pressure column 8 of the decomposing apparatus. Through a line 26 is removed high-boiling fraction from the upper part of the column (in case of air decomposition, the oxygen fraction), and part of this high-boiling fraction is conducted to heat exchanger 10. In the latter it is heated, whereby at the same time the heating gas is cooled. It flows on then through line 17 to the heat exchanger 12 and can be drawn off through line 18. From the lower part 8 of the pressure rectifying column low-boiling fraction is removed by way of line 21 and heated in heat exchanger 13 to about the outlet temperature of the gas work-performingly expanded by the pressure-release turbine 14. Then the gas in opposite stream with the heating gas is heated in heat exchanger 11 to about the difference of the temperature by which it will be cooled in the final expansion in the expansion turbine. The expanded gas flows back through heat exchanger 13 and is carried off in line 28. It unites with the low-boiling fraction coming from the upper column 9 and removed through line 27, and leaves the low temperature unit in the usual way through the regenerators 1–4.

The regenerators 1–4 are changed over at particular intervals of time. Thus, after the change over the air to be decomposed passes through line 5 and regenerators 2 and 4 into the apparatus (see full line arrows), while the nitrogen produced escapes through the regenerator 3 (see broken line arrow) and the oxygen produced through regenerator 1 (see broken line arrow). The regenerators 1, 2, 3, 4 are provided at their upper, hot, ends with automatically change-over valves, and at their lower, cold, ends with automatically acting non-return valves. After a further changeover the air passes through regenerators 1 and 3, the nitrogen through regenerator 4 and the oxygen through regenerator 2.

In FIG. 2 is shown a unit in which the low-boiling gas is used as heating gas. The gas from the upper rectifying column 9 is in this case removed through line 26, led in succession through heat-exchangers 10 and 12, and then through line 23 to the compressor 15. The gas then flows, as previously described, through heat exchangers 12, 11 and 10, and is released in valve 29 to be conducted back to column 9 through line 30.

FIG. 3 shows a unit in which, likewise, oxygen is used as high-pressure heating gas. What was said regarding FIG. 2 substantially applies here. A distinction is that in the arrangement illustrated in FIG. 3 not only is the oxygen led as described through line 23 to the compressor, but at the point 24 this is joined by the gas stream led through line 31. This is branched off at 33 from the stream of gas leaving column 9 through line 26 and led through the coils disposed in the regenerators, which for simplicity are shown in only two regenerators. The amount of gas conducted by one way or the other to the compressor can be set according to the temperature equilibrium in the unit by valves 34 and 35, by hand, or by an automatic regulating device 36, which may be controlled by thermic control elements 37 in the middle of the regenerators or in other heat-sensitive spots.

The functions of the regenerators 1–4 shown in FIGS. 2 and 3 are the same as described in connection with FIG. 1.

This invention is not limited to the kinds of low-temperature units represented in the drawings. Namely, instead of the regenerators, other heat exchangers, such as reversing exchangers, for example, may be used.

In the units described, air and oxygen are used as heating gas. It is possible also in any apparatus by the proper connection in the air decomposition, to use air, oxygen or nitrogen. Also, for the production of cold in the expansion turbines, by a proper choice of the removal and returning conduction points, any gas present in the unit may be used. This process may be applied to other gases than those mentioned in the description of the drawings.

I claim:

1. Process for the production of cold for the low-temperature separation of a gas mixture by means of work-performing expansion of a gas taken from the low-temperature part of an apparatus unit for gas separation said gas being heated by a heating-gas before its work-performing expansion which comprises work-performingly expanding said gas at an elevated temperature level in relation to a needed colder temperature level, further cooling said gas by indirect heat exchange with said gas itself thereby preheating the latter in a first of two heating stages subsequently arranged before being work-performing expanded, and further heating said gas in the second of said two heating stages indirectly by a special heating gas, the difference in temperatures before and after heating in said second heating stage being approximately equal to the difference in temperatures before and after the work-performing expansion of said gas.

2. Process according to claim 1, wherein the special heating gas is compressed to a higher pressure than said gas being heated.

3. Process according to claim 1, in which the gas to be decomposed is air, and air is used as said special heating gas.

4. Process according to claim 1, in which the gas to be decomposed is air, and nitrogen is used as said special heating gas.

5. Process according to claim 1, in which the gas to be decomposed is air, and oxygen is used as said special heating gas.

6. Process according to claim 1, in which the heating gas is compressed to a pressure at which its liquefaction temperature is near that required for heating the gas to be expanded for the performance of work.

7. Process according to claim 1, in which the heating gas to be compressed to high pressure is taken cold in an open circuit from the low temperature part of a gas-liquefying decomposing apparatus, is heated in indirect heat-exchange, is compressed to a higher pressure, is cooled in (a) indirect heating of the gas to be expanded to perform work and (b) in indirect heat-exchange with itself, becoming wholly or partly liquefied in the process, and is throttled into the low temperature part of said decomposing apparatus.

8. Process according to claim 7, further characterized in that a part of the special heating gas taken cold from the low temperature part of the apparatus is heated in heat-exchange with said compressed circulating special heating gas and an additional amount of said special heating gas is heated in the low-temperature apparatus in indirect heat-exchange with the gas to be decomposed.

9. Process according to claim 8, in which the amount of said special heating gas which is in indirect heat exchange with the gas to be decomposed in the low temperature unit is regulated, by temperature-controlling elements, in accordance with the temperature equilibrium in said unit.

10. Apparatus for the production of cold for low-temperature gas separation by means of work-performing expansion of gas taken from the low-temperature part of an apparatus for gas separation, said gas being heated by a heating gas before its work-performing expansion, which comprises a first and second heat-exchanger for heating said gas to be expanded, an expansion machine, a two-stage rectifying column having one stage of high pressure and one stage of low pressure, a compressor for a special heating gas, at least one regenerator for heat-exchange with the gas mixture to be separated, and an expansion device, said heat-exchangers each having a first flow path for said gas to be expanded and a second flow path in the opposite direction, further a third and a fourth heat-exchanger having a first flow path for said special heating gas being compressed to be cooled and a second flow path for a cold medium from the lower part of the low-pressure stage of said two-stage rectifying column to be warmed, the inlet of said first flow path of the first heat-exchanger being connected to the head of the high pressure stage of said two-stage rectifying column for cold gas to be expanded after being preheated and the outlet of said first flow path for said gas to be expanded preheated by expanded gas to the inlet of the first flow path of said second heat-exchanger, the outlet of said first flow path of said second heat-exchanger delivering said gas to be expanded further preheated by said special heating gas being connected to the inlet of said expansion machine the outlet of which is connected to the inlet of the second flow path of said first heat-exchanger, the outlet of said second flow path delivering expanded gas further cooled by said gas to be expanded being connected to said regenerator, the first flow path of said fourth rectifying column to be warmed, the first flow path of said fourth heat-exchanger being connected at its inlet to the outlet of said compressor, and at its outlet to the inlet of said second flow path of said second heat-exchanger, the outlet of said second flow path of said second heat-exchanger being connected to the inlet of the first flow path of said third heat-exchanger and the outlet of said first flow path of said third heat-exchanger being connected to said rectifying column by way of an expansion device, whilst the second flow path of said third heat-exchanger is connected at its inlet to the lower part of the low pressure stage of said two-stage rectifying column and at its outlet to the inlet of the second flow path of said fourth heat-exchanger, the outlet of said second flow path of said fourth heat-exchanger being provided for delivering a portion of gas from said lower part of the low pressure stage of the rectifying column after being warmed to use.

11. Apparatus for the production of cold for low-temperature gas separation by means of work-performing expansion of gas taken from the low-temperature part of an apparatus for gas separation, said gas being heated by a heating gas before its work-performing expansion, which comprises a first and second heat-exchanger for heating said gas to be expanded, an expansion machine, a two-stage rectifying column having one stage of high and one stage of low pressure, a compressor for a special heating gas, at least one regenerator for heat-exchange with the gas mixture to be separated, and an expansion device, said heat-exchangers each having a first flow path for said gas to be expanded and a second flow path in the opposite direction, further a third and a fourth heat-exchanger having a first flow path for said special heating gas being compressed to be cooled and a second flow path for a cold medium from the lower part of the low pressure stage of said two-stage rectifying column to be warmed, the inlet of said first flow path of the first heat-exchanger being connected to the head of the high pressure stage of said two-stage rectifying column for cold gas to be expanded after being preheated and the outlet of said first flow path for said gas to be expanded preheated by expanded gas to the inlet of the first flow path of said second heat-exchanger, the outlet of said first flow path of said second heat-exchanger delivering said gas to be expanded further preheated by said special heating gas being connected to the inlet of said expansion machine the outlet of which is connected to the inlet of the second flow path of said first heat-exchanger, the outlet of said second flow path delivering expanded gas further cooled by said gas to be expanded being connected to said regenerator, the first flow path of said fourth heat-exchanger being connected at its inlet to the outlet of said compressor for said special heating gas and at its outlet to the inlet of said second flow path of said second heat-exchanger, the outlet of said second flow path of said second heat-exchanger being connected to the inlet of the first flow path of said third heat-exchanger and the outlet of said first flow path of said third heat-exchanger being connected to said rectifying column by way of an expansion device, whilst the second flow path of said third heat-exchanger is connected at its inlet to the lower part of the low pressure stage of said two-stage rectifying column and at its outlet to the inlet of the second flow path of said fourth heat-exchanger, the outlet of said second flow path of said fourth heat-exchanger being connected to the inlet of said compressor for said special heating gas.

12. Apparatus for the production of cold for low-temperature gas separation by means of work-performing expansion of gas taken from the low-temperature part of an apparatus for gas separation, said gas being heated by a heating gas before its work-performing expansion, which comprises a first and a second heat exchanger for heating said gas to be expanded, an expansion machine, a two-stage rectifying column, a compressor for a special heating gas, a third and a fourth heat-exchanger for said special heating gas being compressed to be cooled, at least one regenerator for heat-exchange with the gas mixture to be separated, and an expansion device, said first and second heat-exchangers each having a first flow path for said gas to be expanded and a second flow path in the opposite direction, the inlet of said first flow path of the first heat-exchanger being connected to the head of the lower part of said two-stage rectifying column and the outlet of said first flow path of said second heat-exchanger being connected to the inlet of said expansion machine the outlet of which is connected to the inlet of the second flow path of said first heat-exchanger, the outlet of said second flow path being connected to said regenerator, said third and fourth heat-exchanger each having a first flow path for said special heating gas being compressed to be cooled and a second flow path in the opposite direction for a cold medium from the lower part of the upper part of said two-stage rectifying column to be warmed, the inlet of said first flow path of said fourth heat exchanger being connected to the outlet of said compressor, the outlet of said first flow path being connected to the inlet of said second flow path of said second heat-exchanger, the outlet of said second flow path of said second heat-exchanger being connected to the inlet of the first flow path of said third heat-exchanger and the outlet of said first flow path of said third heat-exchanger being connected to said rectifying column by way of an expansion device, whilst the inlet of the second flow path of said third heat-exchanger is connected to the lower part of the upper stage of said two stage rectifying column, and the outlet of said second flow path is connected to the inlet of the second flow path of said fourth heat-exchanger, the outlet of said second flow path of said fourth heat-exchanger being connected by way of a control valve to the inlet of said compressor which is additionally connected by way of a second control valve to the outlets of pipe coils imbedded in two regenerators for cooling the gas mixture to be decomposed, the inlets of said pipe coils being also connected to said lower part of the upper stage of the rectifying column, said control valves being provided to be actuated by the temperature to be maintained in the center of said two regenerators.

References Cited by the Examiner
UNITED STATES PATENTS

| | | | |
|---|---|---|---|
| 2,526,996 | 10/50 | Crawford | 62—13 X |
| 2,583,090 | 1/52 | Cost | 62—39 X |
| 2,785,548 | 3/57 | Becker | 62—13 X |
| 2,827,775 | 3/58 | Linde | 62—13 |
| 2,838,918 | 6/58 | Becker et al. | 62—39 X |
| 2,850,880 | 9/58 | Jakob | 62—13 X |
| 2,873,583 | 2/59 | Potts | 62—14 |
| 2,918,802 | 12/59 | Grunberg | 62—38 X |
| 2,990,914 | 7/61 | Kniel | 62—39 X |

NORMAN YUDKOFF, *Primary Examiner.*

GEORGE D. MITCHELL, ROBERT O'LEARY, EDWARD J. MICHAEL, *Examiners.*